FIP8212    OR    3,953,729

United States Patent [19]
Hosoe et al.

[11] 3,953,729
[45] Apr. 27, 1976

[54] AUTOMATIC FOCUS ADJUSTMENT OF A CAMERA

[75] Inventors: Kazuya Hosoe; Hiroshi Aizawa, both of Machida; Seiichi Matsumoto, Yokohama; Hideo Yokota, Tokyo, all of Japan

[73] Assignee: Canon Kabushiki Kaisha, Tokyo, Japan

[22] Filed: Oct. 21, 1974

[21] Appl. No.: 516,572

[30] Foreign Application Priority Data
Oct. 26, 1973   Japan............................ 48-120556

[52] U.S. Cl................................ 250/201; 250/204; 250/209; 354/25; 354/31
[51] Int. Cl.²............................................ G03B 3/10
[58] Field of Search........ 250/201, 204, 209, 211 R, 250/234; 356/123, 125; 352/140; 353/101; 354/25, 31

[56] References Cited
UNITED STATES PATENTS

| | | | |
|---|---|---|---|
| 3,469,925 | 9/1969 | Urbach et al. | 353/101 X |
| 3,562,785 | 2/1971 | Craig | 356/123 X |
| 3,758,209 | 9/1973 | Harvey | 250/201 X |
| 3,860,935 | 1/1975 | Stauffer | 354/25 |

*Primary Examiner*—Eli Lieberman
*Assistant Examiner*—E. R. LaRoche
*Attorney, Agent, or Firm*—Toren, McGeady and Stanger

[57] ABSTRACT

This invention relates to a system for automatic focus adjustment of an optical system particularly adapted for use in a photographic camera which utilizes non-linear resistance versus illumination response characteristics which are prominent in photoconductive cells such as cadmium sulfide and cadmium selenide cells. In one embodiment, a pair of photoconductive cells, one of which has a photoconductive surface having elongated side portions which contact the electrodes along the length of the elongated side portions and another cell which has an elongated photoconductive surface and shortened end portions and which contact the electrodes only at the shortened end portions, are arranged so that portions of an image-forming light beam entering through an objective of the camera are directed to the photoconductive surfaces on which similar real images of an object are formed. The objective includes at least one lens member movable for focusing associated with an automatic focus control mechanism operative in response to variation of an electrical output signal of the photoconductive cell assembly produced when the degree of sharpness of the image on each of the photoconductive surfaces is varied as the focussing member is moved for focussing purposes with respect to the photoconductive cell assembly.

22 Claims, 18 Drawing Figures

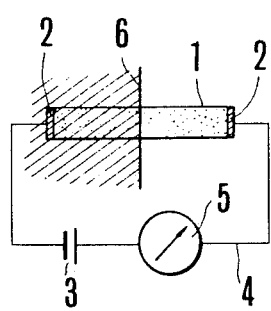
FIG. 1A
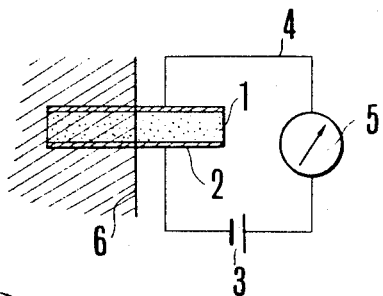
FIG. 1B
FIG. 2
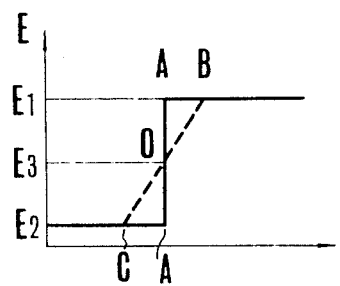
FIG. 3A
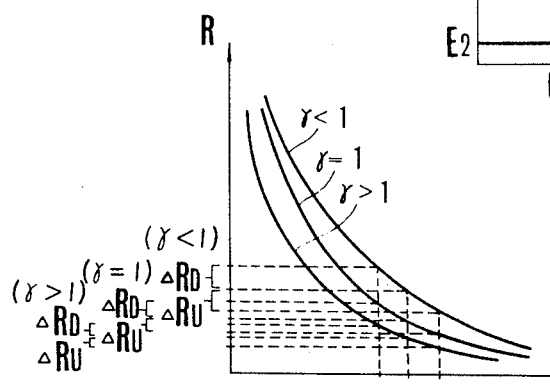
FIG. 3B
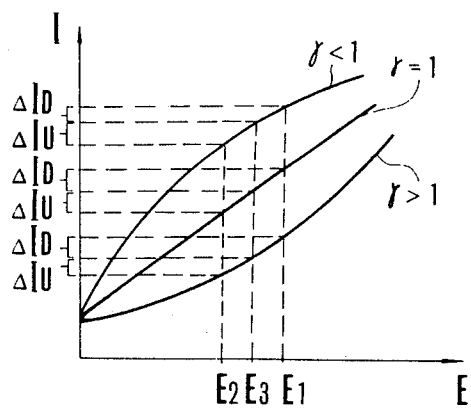

AUTOMATIC FOCUS ADJUSTMENT OF A CAMERA

BACKGROUND OF THE INVENTION

1. Field of the Invention

This invention relates to systems for automatic focus adjustment of optical systems particularly adapted for use in cameras.

2. Description of the Prior Art

Various automatic focusing systems utilizing the non-linearity of photoelectric effect which is priminent particularly in photoconductive cells such as cadmium sulfide and cadmium selenide cells have been proposed for application to apparatus for automatic detection of coincidence between the sharp image and the focal plane in focussing an optical instrument such as camera, or to apparatus for automatic focus adjustment thereof. Examplary of the former apparatus are those described in Japanese Patent Publication Nos. Sho 39-29120 and Sho 41-14500 assigned to the assignee of the present invention, and examplary of the latter is that described in U.S. Pat. No. 3,562,785 to Dwin R. Craig (corresponding to West German Pat. DAS No. 1,173,327 and Japanese Patent Publication No. Sho 44-9501).

The apparatus of Japanese Patent Publication No. Sho 39-29120 utilizes non-linear resistance versus illumination response characteristics inherent to photoconductive cells such as CdS cells for detection of coincidence between the focal plane and the sharp image by sensing the change in resistance of the photoconductive cell produced when the degree of sharpness of the image projected on the photoconductive surface is varied.

Japanese Patent Publication No. Sho 41-14500 is an improvement of the apparatus of the above identified Japanese patent wherein a pair of photoconductive cells are arranged in the path of light on the opposite sides of a predetermined focal plane of an optical system and are connected to a differential circuit for providing an output signal in response to a difference between the outputs of the photoconductive cells which is proportional to the degree of focus of the image so that the output signal is indicative of the degree of coincidence between the image and focal plane of the optical system to be focus-adjusted.

U.S. Pat. No. 3,562,785 utilizes fundamentally the principles of Japanese Patent Publication No. Sho 39-29120 and provides an image adjusting method comprising the projection of similar images of an object onto the image-receiving surfaces of two photoconductive cells by means of an optical system, the cells being arranged in such a manner that one of the image-receiving surfaces receives a sharp image at the time that the other receives an un-sharp image, sensing the change in resistance of the photoconductive cell produced by the change in light distribution on the image-receiving surface resulting from the change in the degree of sharpness of the image, and adjusting the optical system until an electrical response signal of the photoconductive cell assembly reaches a maximum value, and apparatus for automatically adjusting the optical system by using the electrical response signal of the photoconductive cell assembly.

The aforesaid non-linear photoelectric effect of a photoconductive cell is a phenomenon that as the degree of sharpness of an image formed on the photoconductive surface is increased, the electrical response and, particularly, the resistance of the photoconductive cell is increased or decreased. This phenomenon is based on the fact that the amount of incident light per an elementary area of the photoconductive surface varies with variation in sharpness of the image and the distribution of such incident light on the network of the elementary areas remarkably differs when the degree of image sharpness reaches a maximum value. In other words, the difference between the light intensities of two adjacent elementary areas is largest when the sharpest image is formed, causing production of a large difference between the resistances of adjacent elementary areas with the photoconductive surface. Most of the objects which may be usually encountered when photographing, however, have very irregular brightness distributions, and further the brightness ratio between two adjacent elementary areas, or the relative contrast in the image is not always sufficiently high. Consequently, with the image-receiving surface of a photoconductive cell of a geometry which has been used in the prior art, it is difficult to accurately detect an optimum sharpness of the image formed thereon owing to insufficient action of the photoconductive effect, and in conclusion, it may be said that the accurate automatic focus adjustment of the optical system is impossible.

SUMMARY OF THE INVENTION

A first object of the invention is to provide an automatic focus adjusting system which permits full performance of the non-linear resistance versus illumination response characteristics of photoconductive cells for detecting an optimum sharpness of an image with high accuracy, thus making it possible to accurately focus an optical system cooperating therewith.

A second object of the invention is to provide a system for automatic focus adjustment of a photographic camera which permits for an objective of the camera to bring an image of an object into focus accurately and reliably despite the fact that the brightness pattern of the object may be random.

A third object of the invention is to provide a system for automatic focus adjustment of a photographic camera using two photoconductive cells of different electrode arrangement operating in inverted electrical response relation to each other because of the non-linearity resistance versus illumination response characteristics as the degree of sharpness of an image formed on each of the photoconductive cells is varied, whereby the difference between the simultaneously increasing and decreasing electrical output signals of said two photoconductive cells with increase in the degree of sharpness of the image due to the aforesaid inverted electrical responsibilities thereof contributes to the complete system an increased sensitivity to the variation in light distribution of the image even at low light levels so that an objective of the camera can be focused on an object of low contrast satisfactorily.

A fourth object of the invention is to provide a system for automatic focus adjustment of a photographic camera using two photoconductive cells of different electrode arrangement connected either as two arms of a Wheatstone bridge circuit constituting part of an image sharpness detecting circuit, or in an input and feedback circuits of an operational amplifier constituting part of an image sharpness detecting circuit in a manner to utilize the difference between the simultaneously increasing and decreasing electrical output signals of said two photoconductive cells with increase in the degree of sharpness of the image due to the aforesaid inverted electrical responsibilities thereof for increasing the sensitivity of the complete system to the variation in light distribution of the image.

A fifth object of the invention is to provide a camera capable of automatic focus adjustment of a photographing objective thereof by detecting an optimum sharpness of an image of an object aligned therewith.

Other objects and features of the invention will become more apparent from the following detailed description taken in conjunction with the accompanying drawings in which:

BRIEF DESCRIPTION OF THE DRAWINGS

FIGS. 1A and 1B are schematic elevational views illustrating the principles of construction of photoconductive cells of different electrode arrangement adapted for use in the system of the invention in respective operative conditions.

FIG. 2 is a graph depicting the variation of light distribution of an image formed on the surface of a photoconductive cell of FIG. 1.

FIGS. 3A and 3B are graphs depicting resistance versus illumination and current versus illumination response characteristics of the photoconductive cell of FIG. 1 in terms of exponent $\gamma < 1$, $\gamma = 1$ and $\gamma > 1$.

DESCRIPTION OF THE PREFERRED EMBODIMENT

Figure 4A:
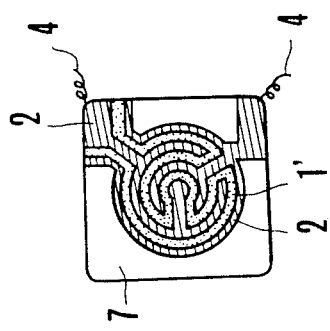
FIGS. 4A and 4B are schematic enlarged elevational views of one embodiment of photoconductive cells of series type electrode arrangement and parallel type electrode arrangement in accordance with the present invention.

One preferred embodiment of a system for automatic focus adjustment of a photographic camera in accordance with the present invention will next be described by reference to the drawings.

The principles of construction of photoconductive cells suitable for use in the system of the present invention are schematically illustrated in FIGS. 1A and 1B, wherein FIG. 1A shows one type of electrode arrangement in a photoconductive cell having a rectangular image-receiving surface of which the length of the shorter sides is far shorter than that of the longer sides and associated with a pair of electrodes 2 contacting the respective shorter sides of the photoconductive surface and connected by leads 4 to a battery 3 through an electrical indicator 5, this photoconductive cell of the electrode arrangement being hereinafter referred to as "series type cell," while FIG. 1B shows another type of electrode arrangement in a photoconductive cell having a rectangular image-receiving surface of which the length of the shorter sides is far shorter than that of the longer sides and associated with a pair of electrodes 2 contacting the respective longer sides and connected by leads 4 to a battery 3 through an electrical indicator 5, this photoconductive cell being hereinafter referred to as "parallel type cell." A real image of an object formed on the photoconductive surface 1 by a not shown image-forming optical system also is shown as having a light distribution which abruptly changes at a line 6.

As the length of the longer sides of a photoconductive surface is increased extremely as compared with the shorter sides, the probability of encountering images of which brightness boundaries 6 are not parallel to the electrodes of the cell as shown in FIG. 1A is increased in the series type cell, while the probability of encountering images of which the brightness boundaries 6 are not perpendicular to the electrodes as shown in FIG. 1B is increased in the parallel type cell.

Consideration will now give to the difference between electrical response characteristics of these two type cells of widely different electrode arrangement with respect to the variation particularly in resistance or conductance produced therein by the variation in light distribution due to the variation in degree of sharpness of the image. Two typical examples of the light distribution of an image on the photoconductive surface are shown diagrammatically in FIG. 2, wherein the ordinate is in light intensity and the abscissa is in distance in a direction perpendicular to the boundary line 6, the solid line curve representing a light distribution under conditions prevailing when a sharp image is formed on the photoconductive surface 1, and the dashed line curve representing a light distribution under conditions prevailing when an unsharp image is formed on the photoconductive surface 1.

In general, electrical characteristics of a photoconductive cell are expressed in terms of the relation between resistance R and illumination represented by the following formula $$R = KE^{-\gamma} \qquad (1)$$

wherein $K$ and $\gamma$ are constants inherent to the characteristics of the photoconductive cell. Hence, upon application of a predetermined voltage between the electrodes of the photoconductive cell, the current flowing through the photoconductive cell may be expressed by the following formula $$I = K'E^{\gamma} \qquad (2)$$

wherein $K'$ is a constant dependent upon the characteristics inherent to the photoconductive cell and upon the voltage applied therebetween.

The formula (1) relating resistance R to illumination E and the formula (2) relating current I to illumination E are graphically shown in FIGS. 3A and 3B respectively in connection with different exponents, i.e., $\gamma < 1$, $\gamma = 1$ and $\gamma < 1$. Assuming now that a change in light distribution of an image on the photoconductive surface is produced in the vicinity of line 6 as from the solid line curve A—A to dashed line curve B—C shown in FIG. 2, the initial illumination $E_1$ in the right side vicinity of line 6 is decreased by different amounts with different distances from line 6 over a distance range AB, while the initial illumination $E_2$ in the left side vicinity of line 6 is increased by different amounts with different distances from line 6 over a distance range AC. In this case, the average illumination $E_3$ over the distance range CB may be considered to be $(E_1+E_2)/2$. Further, the total of the illumination decreases integrated over the distance range AB may be approximated by an illumination decrease from $E_1$ to $E_3$, and the total of the illumination increases integrated over the distance range AC may be approximated by an illumination increase from $E_2$ to $E_3$ provided that the distances AB and AC are negligibly small. On the other hand, by differentiating the equation (1) two times, we obtain the following equation:

$$\frac{d^2I}{dE^2} = K\gamma(\gamma+1)E^{-(\gamma+2)} > 0 \qquad (3)$$

It follows from equation (3) that in the case of $\gamma < 1$, a local resistance increase $\Delta R_U$ resulting from the local illumination decrease from $E_1$ to $E_3$ is smaller than a local resistance decrease $\Delta R_D$ resulting from the local illumination increase from $E_2$ to $E_3$, namely $\Delta R_U < \Delta R_D$. As a result, the algebraical sum of these local resistance changes produced by local illumination changes is negative, so that the overall resistance value of the photoconductive cell is decreased with increase in current. This is likewise true in the cases of $\gamma = 1$ and $\gamma > 1$. It is to be understood that when an optimum sharpness of the image is attained, the resistance of the series type cell reaches a peak value.

In the case of the parallel type cell, the situation is more complicated. By differentiating the equation (2) two times, we obtain the following equation (4):

$$\frac{d^2I}{dE^2} = K'\gamma(\gamma-1)E^{\gamma-2} \qquad (4)$$

so that where $\gamma < 1$, $\gamma = 1$ and $\gamma > 1$, the following formulae are respectively resulted $$\frac{d^2I}{dE^2} < 0 \quad \frac{d^2I}{dE^2} = 0 \quad \frac{d^2I}{dE^2} > 0$$

It follows that $\Delta I_U > \Delta I_D$ for $\gamma < 1$; $\Delta I_U = \Delta I_D$ for $\gamma = 1$; and $\Delta I_U < \Delta I_D$ for $\gamma > 1$, wherein $\Delta I_U$ is the current increase resulting from the local illumination increase in the distance range AC and $\Delta I_D$ is the current decrease resulting from the local illumination decrease in the distance range AB. In other words, where $\gamma < 1$, when an optimum sharpness of the image is attained, the photocurrent flowing through the photoconductive cell is at minimum (the resistance at maximum). Where $\gamma = 1$, the current (resistance) is maintained constant despite of any change in local illumination of the image. Where $\gamma > 1$, when an optimum sharpness of the image is attained, the photocurrent reaches a maximum value (the resistance at minimum).

As is evident from the foregoing discussion that, where $\gamma < 1$, the series type cell and the parallel type cell, though both having non-linear photoelectric effects, behave in an inverse manner to each other with respect to the electrical response and particularly to the resistance variation produced by the variation in light distribution resulting from the variation in sharpness of the image. Therefore, as the degree of sharpness of similar images formed respectively on the series type and parallel type cells is increased, the series type cell acquires an increasing resistance value, while the parallel type cell loses an increasing resistance value, thereby contributing to the complete system a greatly increased sensitivity to an optimum sharpness of the image as compared with a system including only type photoconductive cell.

The present invention in its broader aspects utilizes the inverse electrical response characteristics of these two type photoconductive cells to each other for improving the sensitivity of an image sharpness detecting system section, as by arranging the photoconductive cells so as to effect the summing of the inverse photoelectric effects based on such electrical characteristics of the cells, making it possible for the automatic focus adjusting system to achieve the focussing of an optical system cooperating therewith in automatic response to an accurate detection of an optimum sharpness of the image.

Figure 4B:
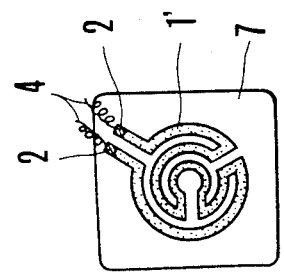

One embodiment of the present invention includes a series type photoconductive cell and a parallel type photoconductive cell shown in FIGS. 4A and 4B, wherein FIG. 4A shows a practical example of a series type photoconductive cell having a photoconductive surface 1' of a geometry such that three concentric equally-spaced rings of equal width from each other are interconnected between the successive two rings at suitable positions to establish a single current path with the photoconductive substance, and a pair of electrodes 2 contacting the respective ends of the current path and to which respective leads 4 are connected, the parts 1' and 2 being mounted on an insulated substrate 7, and FIG. 4B shows a practical example of a parallel type photoconductive cell having a photoconductive surface 1' of an identical geometry to that of FIG. 4A and a pair of electrodes arranged along the current path with the photoconductive substance, two spaced portions of the electrodes 2 being connected to respective leads 4, and the part 1' and 2 being mounted on an insulated substrate 7. The geometry of the photoconductive surface 1' shown in FIGS. 4A and 4B is largely different from that of the photoconductive surface 1 shown in FIGS. 1A and 1B, but they are identical in the fundamental construction of the current path to each other. Taking into account variaty of orientations of the brightness boundaries between adjacent dark and bright areas in a real image of any object which may be usually encountered, a complicated geometry is imparted to the photoconductive surface as shown in FIGS. 4A and 4B so as to permit the above mentioned photoconductive effect to work efficiently in the photoconductive cells. Since various modifications may be made in the geometry of the photoconductive surface, it is intended that the feature of the photoconductive cell shall be interpreted as illustrative.

Seven examples of the image sharpness detecting circuit containing a series type photoconductive cell and a parallel type photoconductive cell suitable for use in the system of the invention are shown in FIGS. 5A through 5G, wherein the series type and parallel type cells are designated by $Rs$ and $Rp$ respectively.

Figure 5C:
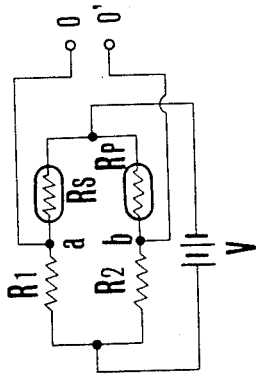
FIGS. 5A – 5G are diagrams of various image sharpness detecting circuit suitable for use in the system of the invention.
Figure 5B:
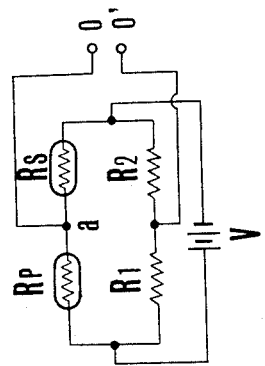
Figure 5A:
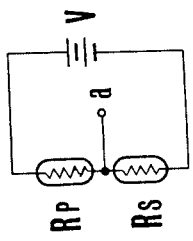

FIG. 5A shows a circuit comprising cells $Rs$ and $Rp$ connected in series to a power source V, so that the potential at an interconnection point, a, between the cells $Rs$ and $Rp$ varies with the relative variation of the resistance values of cells $Rs$ and $Rp$. In the case of $\gamma > 1$ for cell $Rp$, as the degree of sharpness of similar images on the respective cells Rs and Rp increases, the resistance value of cell Rs is increased, but the resistance value of cell Rp is decreased, so that the potential of the interconnection, a, is increased to a maximum value when an optimum sharpness of the image on each of the cells is attained.

FIG. 5B shows a circuit comprising cells Rs and Rp connected in series circuit and a fixed resistor R₁ and a variable resistor R₂ connected in series circuit, these series circuits being connected in parallel to a power source V to form a Wheatstone bridge circuit. In the case of γ > 1 for cell Rp, as the degree of sharpness of an image on each of cells Rs and Rp is increased, the resistance value Rs is increased while the resistance value Rp is decreased, so that the potential of the interconnection point, a, between cells Rs and Rp, or a voltage produced between the output terminals, 0 and 0' of the bridge circuit is increased to a maximum value when an optimum sharpness of the image is attained.

FIG. 5C shows a circuit comprising a cell Rs and a fixed resistor R₁ connected in series circuit and a cell Rp and a variable resistor R₂ connected in series circuit, these series circuits being connected in parallel with a power source V to form a Wheatstone bridge circuit. In the case of γ > 1 for cell Rp, when an optimum sharpness of each of the image on the cells Rs and Rp is attained, the potential of an interconnection point, a, between cell Rs and resistor R₁ reaches a maximum value, while the potential of an interconnection point, b, between cell Rp and resistor R₂ reaches a minimum value, so that the voltage produced between the output terminals 0 and 0' of the bridge circuit reaches a maximum value when an optimum sharpness of the image is attained. In the case of γ = 1 for cell Rp, the resistance value of cell Rp is independent of the degree of sharpness of the image, but dependent upon the total light intensity of the image so that as the degree of sharpness of the image is increased, the potential at the point, a, is increased, but the potential at the point, b, is maintained constant. Therefore, the ramp of voltage between the output terminals 0 and 0' resulting from the variation in sharpness of the image is decreased although the voltage reaches a maximum value when an optimum sharpness of the image is attained.

Figure 5E:
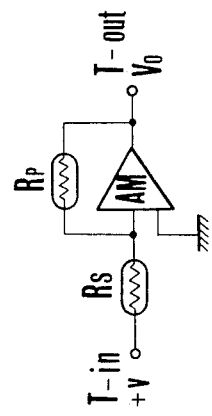
Figure 5G:
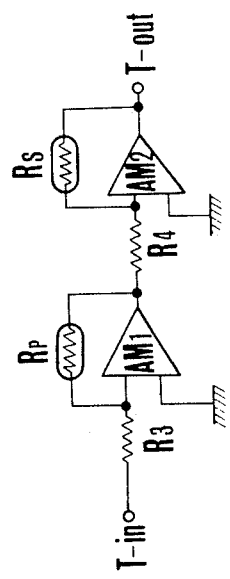
Figure 5D:
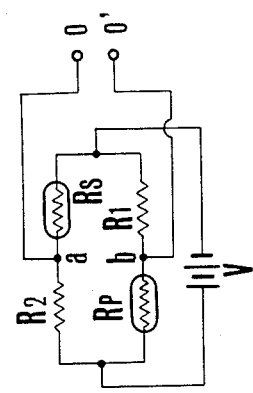

FIG. 5D illustrates a circuit comprising a cell Rs and a cell Rp of γ < 1 connected as two opposite arms of a Wheatstone bridge of which other opposite arms are a fixed resistor R₁ and a variable resistor R₂. A power source V is connected in parallel with the series circuit containing resistor R₂ and cell Rs and with the series circuit containing cell Rp and resistor R₁. In this case, as the degree of sharpness of similar images on the cells Rp and Rs is increased both the resistance values of Rs and Rp are increased with increase in the potential of an interconnection point, between cell Rs and resistor R₂, and with decrease in the potential of an interconnection point, b, between cell Rp and resistor R₁, so that the voltage produced between the output terminals of the bridge circuit increases to a maximum value when an optimum sharpness of the image is attained. The cell Rp of γ < 1 may be replaced by a cell Rs having identical characteristics thereto.

FIG. 5E shows a circuit comprising a cell Rs connected to an input terminal of an operational amplifier Am, and a cell Rp connected in the feedback network of the amplifier AM. When a voltage, +V is applied to the input terminal, T-in, of the amplifier AM, an output voltage, V₀ appearing at its output terminal, T-out, may be expressed by the following formula:

$$V_o = - \frac{Rp}{Rs} V \qquad (6)$$

In the case of γ > 1 for cell Rp, therefore, as the degree of sharpness of the image on each of the cells is increased, the resistance value of cell is increased, while the resistance value of cell Rp is decreased, so that the ratio of Rp/Rs is decreased with decrease in the gain of the amplifier AM and with decrease in the output voltage V₀. It follows that when an optimum sharpness of the image is attained, the voltage V₀ reaches a minimum value, thus it being made possible to detect an optimum sharpness of the image.

Figure 5F:
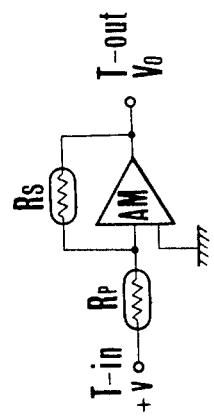

FIG. 5F shows a circuit of construction different from that of FIG. 5E in the fact that the cell Rp is connected to the input terminal, T-in, of the operational amplifier AM and the cell Rs is connected in the feedback network of the amplifier AM. In this case, the output voltage V₀ to an input voltage +V is expressed by the following formula:

$$V_o = - \frac{Rs}{Rp} V \qquad (7)$$

In the case of γ > 1 for cell Rp, therefore, as the degree of sharpness of the image on each of the cells is increased, the ratio of Rs/Rp is increased to effect a reverse result to that of FIG. 5E.

FIG. 5G shows a circuit comprising cells Rp and Rs connected in respective feedback networks of operational amplifiers AM₁ and AM₂ cascade-connected to each other, and resistors R₃ and R₄ connected to respective input terminals of the amplifiers AM₁ and AM₂. In this case, the output voltage appearing at the output terminal, T-out, is varied, in accordance with the ratio of the product of R resistance values of cells Rp and Rs to the product of the resistance values of resistors R₃ and R₄. Therefore, in the case of γ < 1 for the cell Rp, as the degree of sharpness of each of the images on the cells is increased, both the resistance value of cells Rs and Rp are increased with increase in the voltage of the output terminal, T-out, reaching a maximum value when an optimum sharpness of the image is attained.

Figure 6:
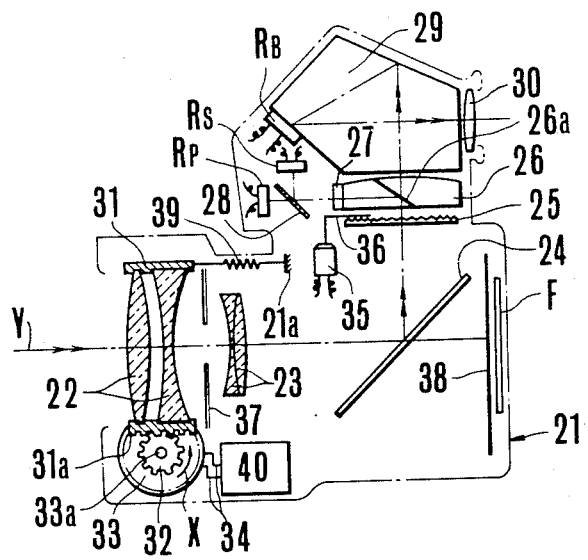
FIG. 6 is a schematic sectional view illustrating an arrangement of the basic elements of an automatic focus adjusting camera embodiing one form of the present invention.

FIG. 6 shows an arrangement of the basic parts of an apparatus for automatic focus adjustment of a camera embodying one form of the invention as applied to a single lens reflex camera that is indicated at 21. The arrangement includes a first lens member 22 movable for focussing supported in a barrel 31, a second lens member 23 stationary during the focussing, the first and second lens members 22 and 23 constituting an objective lens assembly of the camera 21 as well as part of an image sharpness detecting optical system, a diaphragm 37 intervening between the member 22 and 23, and a first half mirror 24 disposed between the objective lens assembly 22 and 23 and a shutter 38 at an angle with the vertical to reflect a suitable portion of the light entering through the objective lens assembly 22 and 23 upward onto a focussing screen 25, where an image of an object intended to be photographed is formed. Light from the image on the screen 25 is radiated upward through a condensor lens 26 into a pentaprism 29 which reflects the entering light to an eyepiece 30. The parts 24, 25, 26, 29 and 30 constitute a finder optical system of conventional structure. In a central portion of the condensor lens 26, there is provided a partly mirrored surface 26of a suitable reflectance-to-transmittance ratio which deflects part of the light from the image on the screen 25 onto a projecting lens 27 constituting part of the image sharpness detecting optical system, the lens 27 being arranged at the side of the condensor lens 26. A second half mirror 28 is arranged in the path of the projection light from the lens 27 to reflect a portion thereof to a series type photoconductive cell Rs and transmit the other portion to a parallel type photoconductive cell Rp so that the image formed on the screen 25 by the objective lens 22 and 23 through the first half mirror 24 is projected by the projection lens 27 onto the image-receiving surfaces of the cells Rs and Rp where similar images of the same sharpness of that of the image on the screen are formed again.

An additional photocell $R_B$ serving as a sensor of an exposure control system is provided as mounted adjacent a partially light-permeable portion 29a of a front face of the penta prism 29 to provide information representative of the level of brightness of the object and which is translated into the deflection of a needle 36 of a meter 35 by suitable means known in the art to permit the operator looking through the view finder to evaluate an effective exposure value. This exposure control system does not constitute the essential part of the invention, and, therefore, its description will be hereinbelow limited to such an extent as not to preclude the understanding of the invention.

The lens barrel 31 supporting the focussing lens member 22 is provided with a rack 31a formed in an outer peripheral portion thereof and engaging with a gear 32 fixedly mounted on an output shaft 33a of a motor 33 which is connected by a pair of leads 34 to a control circuit 40. Connected between the lens barrel 31 and the camera housing 21a is a helical tension spring 29 which tends to move the barrel 31 toward the right as viewed in FIG. 6 so that upon actuation of the apparatus, the focussing member 22 supported in the barrel 31 is caused to move toward the left along its optical axis Y as the motor 33 is driven for rotation in a counter-clockwise direction of arrow X, and upon termination of the operation, the focussing member 22 is caused to move toward the right until restoring the initial retracted position.

Figure 8:
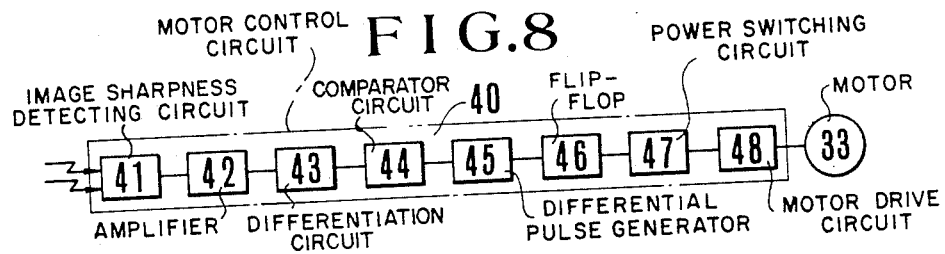
FIG. 8 is a block diagram of a control system suitable for use in the apparatus of FIGS. 6 and 7.

Referring to FIG. 8, the motor control circuit 40 is illustrated as comprising an image sharpness detecting circuit 41 which may be any one of the circuit shown in FIGS. 5A through 5G, but is preferably other than the circuit shown in FIG. 5E because it is desired to increase the sensitivity at the time when an optimum sharpness of the image is attained, an amplifier circuit 42, a differentiation circuit 43, a comparator circuit 44, a differential pulse generator circuit 45, a flip-flop circuit 46, a power switching circuit 47 and a motor drive circuit 48 having an output terminal connected to the motor 33.

Figure 9:
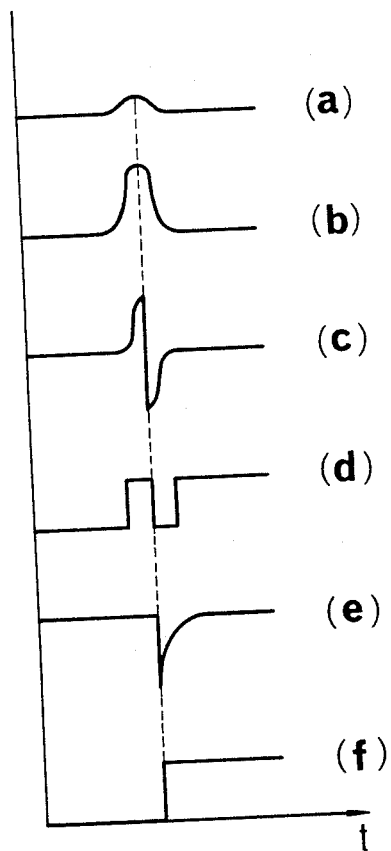
FIG. 9 is a timing chart illustrating variations with time of the outputs of certain blocks in the system of FIG. 8 in operation of the apparatus of FIGS. 6 and 7.

FIG. 9 graphically illustrates various voltage relationships of output signals from the circuits 41 through 46 in the control circuit developed during operation of the apparatus of FIG. 8 by plotting voltage magnitude as a function of time. As the degree of sharpness of the images on the cells Rs and Rp is varied by moving the focussing member 22, the output of the image sharpness detecting circuit 41 is varied as shown by curve (a), reaching a peak value when an optimum sharpness of the image is attained. Responsive to the output (a) from circuit 41, the amplifier circuit 42 produces an output (b) with magnitude sufficient large for the subsequent circuits to satisfactorily operate, which is then directed to the differentiation circuit 43. The output of circuit 43 is inverted in polarity when the image passes through the sharpest focus conditions and such an inversion is effected in a very short time interval at a point of zero voltage. In response to such a rapid inversion of voltage polarity, that is, in response to detection of an optimum sharpness of the image, the comparator 44 produces an output signal of wave form as shown by curve (d) which is applied to the differential pulse generator circuit 45 to produce a pulse of wave form shown by curve (e) at the point of the sharpest focus of the image. Upon advent of such a pulse, the flip-flop circuit 46 is transferred to a conducting state to produce an output voltage of wave form as shown by curve (f).

The operation of the automatic focusing apparatus of the construction described above incorporated in a single lens reflex camera will next be described in connection with the exposure operation of the camera. When the operator aligns the camera with an object intended to be photographed and then depresses a not shown, for example, two-stage operating shutter release button until the first stage, the control circuit 40 is energized to render operative the automatic focussing apparatus, thereupon the motor 33 is driven for rotation to displace the focussing member 22 from the retracted position to the left as viewed in FIG. 6 against the force of the spring 39, while the degree of sharpness of the images on the cells is varied with variation of the output of the image sharpness detecting circuit 41. When the focussing member arrives at a position where the sharpest images are formed on the image-receiving surfaces of cells Rs and Rp, the output of detecting circuit 41 reaches the peak value, thereupon the pulse shown in FIG. 9(e) is caused to appear at the output terminal of the differential pulse generator circuit 45. Upon advent of the pulse on the input of the flip-flop circuit 46, the power switching circuit 47 having an input connected thereto is brought into operation causing the normally energized motor drive circuit 48 to be rendered inoperative to rapidly stop the motor 33 from rotation. As a result, the focussing member 22 is displaced to and held in a position where the sharpest images on the image-receiving surface of the cells Rs and Rp, in other words, on the film plane F are formed thereby.

On the other hand, the camera operator, renders operative the exposure control system by actuation of not shown means know in the art, thereupon the needle 36 of the motor 35 which can be seen by the operator looking through the view finder is deflected by an angular distance in response to the output of the photocell $R_B$. On the basis of the indication of the meter needle 36, the operator may adjust the diaphragm 37 so as to make a correct exposure.

Next the release button is further depressed from the first stage to the second stage to actuate the shutter 38, thereupon an exposure is initiated. After the film F has been exposed, the camera operator releases the release button from the active condition, thereupon the automatic focussing apparatus is rendered inoperative, permitting the focussing member 22 to return to the initial retracted position under the action of the spring 39.

Therefore, the camera is now ready for the next focus adjustment and exposure operations. When the operator desires to align the camera with another object of different distance and actuates the release button, an automatic focussing procedure similar to that described above is repeated again until the photographing objective lens is brought into good focussing conditions under which an exposure of the film is effected.

Figure 7:
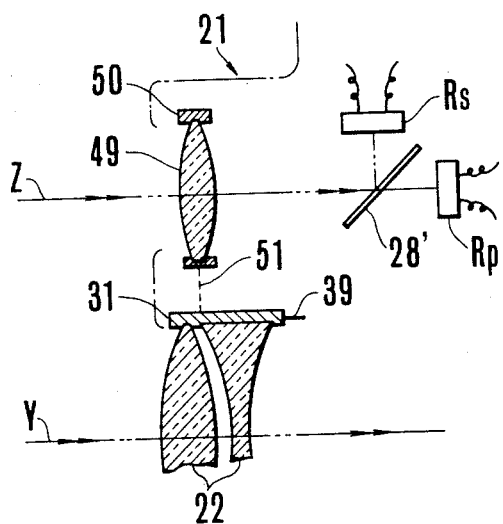
FIG. 7 is a fragmentary schematic sectional view of a variation of the system of the present invention employed in FIG. 6.

The invention has been described above in connection with a purely schematic example of which of course can be changed in many ways. For example, instead of utilizing the objective lens assembly 22 and 23 as the image-forming optical system for the image sharpness detection, it is possible to use an additional lens 49 adapted only for the image sharpness detection as shown in FIG. 7. The lens 49 is supported in a barrel 50 which is connected by a suitable mechanical linkage to the barrel 31 supporting the focussing member 22 therein so that the lens 49 is movable along its optical axis Z in response to movement of the focussing member 22. A half mirror 28' is provided as arranged in the path of an image-forming light from the lens 29 to reflect a portion of thereof to a cell Rs and to transmit the other portion to the cell Rp, where similar images of an object aligned with the camera are formed. Responsive to the degree of sharpness of the image, the control circuit 40 operates in a manner similar to that described in connection with FIGS. 6, 8 and 9. It is evident that the lens 49 is so designed as to form a sharpest image on the image-receiving surfaces of the cells at the time when the objective lens 22 and 23 forms a sharpest image of the same object on the film plane.

In the apparatus of FIGS. 6 and 7, an electrical circuitry of producing a minimum output signal in response to an optimum sharpness of the image such as that shown in FIG. 5E may be selected for employment as the image sharpness detecting circuit 41. Even in this case, the principle of detecting an optimum sharpness of the image is the same as above, which permits for the automatic focussing system employing such a circuit to be constructed in a manner similar to that described above without decreasing the degree of dependability.

Moreover, instead of the first half mirror 24, it is possible to use a tiltable mirror as provided in a conventional single lens reflex camera, upon actuation of the shutter 38, to be displaced from the path of light from the objective lens.

Since various modification and structural changes may be made without departing from the present invention, it is therefore intended that all matter contained in the above description or shown in the accompanying drawings shall be interpreted as illustrative and not in a limiting sense.

What is claimed is:
1. A system for automatic focus adjustment of a photographic camera comprising:
  a. an objective lens assembly for focussing an image of an object in a predetermined position said objective lens assembly including at least one lens member movable along the optical axis of the objective lens for focussing said image in said predetermined position;
  b. an optical system for image sharpness detection capable of focussing an image of the same object as above, said optical system including as a component at least said movable member of the objective lens assembly; and
  c. image sharpness detecting means for detecting an optimum sharpness of the image formed by said image sharpness detection optical system comprising:
    1. first and second photoelectric transducing means of different electrical response characteristics from each other with respect to the change in sharpness of the image; and
    2. circuit means electrically connected to said first and second transducing means for producing an output signal proportional to the difference between the electrical responses of said first and second cell means, wherein the focus adjustment of said objective lens assembly to selected objects in various distances is automatically effected, and wherein said first photoelectric transducing means has non-linear electrical response characteristics such that its output is increased with increase in sharpness of the image, and said second photoelectric transducing means has non-linear electrical response characteristics such that its output is decreased with increase in sharpness of the image.

2. A system as described in claim 1, in which said circuit means has an operational amplifier and said first transducing means is connected to the feed-back circuit of said operational amplifier and said second transducing means is connected to the input circuit of said operational amplifier.

3. A system as described in claim 1, in which said circuit means has an operational amplifier and said first transducing means is connected to the input circuit of said operational circuit and said second transducing means is connected to the feed-back circuit of said operational amplifier.

4. A system as described in claim 1, said first and second photoelectric transducing means including first and second electrodes, and wherein said first photoelectric transducing means includes an elongated photoconductive surface having elongated side portions, said first electrodes contacting said surface along said elongated side portions, said second photoelectric transducing means including an elongated photoconductive surface having shortened end portions, said second electrodes contacting said surface only at said shortened ends.

5. A system as described in claim 4 in which said photoconductive surfaces of said first and second photoelectric transducing means are in the form of a sinuous strip.

6. A system as described in claim 1, wherein said image sharpness detecting means is provided with pulse generating means arranged to produce a pulse signal in response to an output signal of said circuit means at the time when an optimum sharpness of the image on each of said first and second photoelectric transducing means is attained.

7. A system as described in claim 6, wherein said image sharpness detecting means is provided with control means arranged to control the operation of said operable means in accordance with an output of said pulse generating means.

8. A system as described in claim 1, wherein said image sharpness detection optical system is provided with reflecting means for deflecting a light beam by an angle arranged to be movable to an ineffective operating position from an effective operating position where it lies in the optical path between said objective lens assembly and said predetermined focus position.

9. A system as described in claim 8, wherein said image sharpness detection optical system is provided with projection lens means for projecting a real image formed by said objective lens assembly, said projection lens means being arranged between said reflecting means and said first and second transducing means to project said image onto said first and second transducing means.

10. A system as described in claim 9, wherein said image sharpness detection optical system is provided with beam-splitting means for splitting an image-forming beam projected by said projection lens means, said means being arranged between said projection lens means and the focus position of said projection lens means split said image-forming beam into two portions, one of which is directed to said first transducing means and another portion which is directed to said second transducing means.

11. A system for automatic focus adjustment of a photographic camera comprising:
   a. an objective lens assembly for focussing an image of an object in a predetermined position, said objective lens assembly including at least one lens member movable along the optical axis of the objective lens for focussing said image in said predetermined position;
   b. beam-splitting means arranged between said objective lens assembly and said predetermined focus position in the optical path of said objective lens assembly to split an image-forming light beam entering through said objective lens assembly into two portions;
   c. image sharpness detecting means arranged to receive one of said two beam portions split by said beam-splitting means; said detecting means comprising:
      1. first and second tranducing means of different electrical response characteristics from each other with respect to the change in sharpness of the image; and
      2. circuit means electrically connected to said first and second transducing means for producing an output signal proportional to the difference between the electrical responses of said first and second transducing means; and
   d. operable means for moving the movable lens member of said objective lens assembly arranged so that the operation of said operable means is controlled in accordance with the output signal of said image sharpness detecting means, whereby the focus adjustment of said objective lens assembly to selected objectives in various distances is automatically effected, and wherein said first photoelectric transducing means has non-linear resistance versus illumination response characteristics such that the internal resistance value thereof is decreased with increase in sharpness of the image, and said second photoelectric transducing means has non-linear resistance versus illumination response characteristics such that the internal resistance value thereof is increased with increase in sharpness of the image.

12. A system as described in claim 11, wherein said circuit means forms a bridge circuit having a first branch with said first transducing means connected therein, and a second branch with said second transducing means connected therein.

13. A system as described in claim 11, wherein said circuit means forms an operational amplifier having one transducing means connected as an input circuit and the other transducing means as a feed-back circuit.

14. A system as described in claim 11, wherein said circuit means forms two operational amplifiers with said transducing means, each of said amplifiers having one said transducing means connected in its feed-back circuit.

15. A system as described in claim 11, said first and second photoelectric transducing means including first and second electrodes, and wherein said first photoelectric transducing means includes an elongated photoconductive surface having elongated side portions, said first electrodes contacting said surface along said elongated side portions, said second photoelectric transducing means including an elongated photoconductive surface having shortened end portions, said second electrodes contacting said surface only at said shortened ends.

16. A system as described in claim 15, in which said photoconductive surfaces of said first and second photoelectric transducing means are in the form of a sinuous strip.

17. A system as described in claim 11, wherein said image sharpness detecting means is provided with pulse generating means arranged to produce a pulse signal in response to an output signal of said circuit means at the time when an optimum sharpness of the image on each of said first and second photoelectric transducing means is attained.

18. A system as described in claim 17, said operable means being provided with driving means including a motor.

19. A system as described in claim 18, wherein said image sharpness detecting means is provided with control means arranged to control the operation of said motor in accordance with an output signal from said pulse generating means.

20. A system for automatic focus adjustment of a photographic camera comprising:
   a. an objective lens assembly for focussing in a predetermined position of focus an image of an object which may be encountered at various distances from the camera, said objective lens assembly including at least one lens member movable along the optical axis of the objective lens for focussing said image of a selected object in said predetermined focus position;
   b. an optical system for image sharpness detection capable of focussing an image of the same object as above, said optical system including as a component at least the movable member of the objective lens assembly, said system further including:
      1. reflecting means for deflecting a light beam by an angle arranged to be movable to an ineffective operating position from an effective operating position where it lies in the optical path between said objective lens assembly and said predetermined focus position;
      2. projection lens means arranged in the optical path deflected by said reflecting means in its effective operating position to project a real image formed by said objective lens assembly; and
      3. beam-spliting means arranged between said projection lens means and a focus position thereof to split an image-forming light beam projected by said projection lens means into two portions;

c. image sharpness detecting means for detecting an optimum sharpness of the image formed by said image sharpness detection optical system comprising:
 1. first photoelectric transducing means having non-linear electrical response characteristics such that its output is increased with increase in sharpness of the image, said means being arranged in the position of the image formed by said projection lens means to receive one of said split beam portions split by said beam-splitting means;
 2. second photoelectric transducing means having non-linear electrical response characteristics such that its output is decreased with increase in sharpness of the image, said means being arranged in the position of the image formed by said projection lens means of said image sharpness detection optical system to receive the other portion of said image-forming light beam split by said beam-splitting means; and
 3. circuit means electrically connected to said first and second photoelectric transducing means upon detection of an optimum sharpness of the image from variation of outputs of said first and second transducing means to produce an output signal corresponding thereto; and
d. operable means for moving the movable lens member of said objective lens assembly arranged so that the operation of said operable means is controlled in accordance with the output signal of said image sharpness detecting means;
whereby the focus adjustment of said objective lens assembly to an object which may be encountered at various distances from the camera is automatically effected.

21. A system as described in claim 20, wherein said operable means is provided with driving means including a motor.

22. A system as described in claim 21, wherein said image sharpness detecting means is provided with control means arranged with an output signal from said circuit means.

* * * * *